United States Patent Office 3,252,932
Patented May 24, 1966

3,252,932
RESIN COMPOSITIONS COMPRISING A SEGMENTED FLUORINE-CONTAINING COPOLYMER AND AN AMINOPLAST
Archibald N. Bolstad, Afton Township, Washington County, Patsy O. Sherman, Bloomington, and Samuel Smith, Roseville, Minn., assignors to Minnesota Mining and Manufacturing Company, St. Paul, Minn., a corporation of Delaware
No Drawing. Filed Dec. 10, 1962, Ser. No. 243,642
5 Claims. (Cl. 260—29.4)

This application is a continuation-in-part of Serial No. 832,490, filed August 10, 1959, now Patent No. 3,068,187.

This invention relates to new and useful segmented fluorine-containing copolymers in combination with triazine formaldehyde resins and to the treatment of textiles therewith.

Fluorine-containing polymers are known to be effective materials for treating substrates, e.g. U.S. Patent 2,803,615, wherein it was realized that durability would be enhanced by applying a polymer. In the present invention it has been discovered that certain segmented fluorine-containing copolymers are at least as effective and have unique advantages of their own wherein their solubility characteristics are materially altered and durability of surface treatments is materially enhanced over previous polymers. This enhanced durability is especially important where cleaning operations are required, such as in the treatment of decorative and apparel fabrics, leather jackets and coats and painted surfaces. The durability requirements for apparel fabrics is particularly stringent in those articles which are frequently laundered or dry cleaned. Fabrics of this nature which have been treated with the segmented copolymers of this invention are very durable in that the surface properties imparted to the fabrics remain almost unaffected after long wear and successive dry cleanings and launderings.

The segmented copolymers of this invention have at least one fluorine-containing segment, hereinafter referred to as "Segment A," comprising at least four fluorine-containing monomeric units, hereinafter referred to as "$a$ units," having a perfluoroalkyl group of the general formula $C_nF_{2n+1}$, where $n$ is at least 4 and less than 20 (preferably 5 to 10). Segment A contains at least 30 percent and up to 75 percent (preferably 40 to 70 percent) by weight of fluorine derived from the perfluoroalkyl group. The remaining segments, hereinafter referred to as "Segment B," are comprised principally of polymerized monomeric units of an ethylenically unsaturated monomer, hereinafter referred to as "$b$ units," different from the $a$ units of Segment A. Segment B is made up of at least 5 consecutive $b$ units and contains less than 10 percent (preferably from 0 to 5 percent) by weight of fluorine in $C_nF_{2n+1}$ groups where $n$ is as stated above. For purposes of illustrating the invention, such segmented copolymers can be represented by the generic formula:

(Segment A)$_m$ 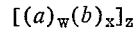 (Segment B)$_p$ where $m$ and $p$ are integers, Segment A is from 0.5 to 80 percent by weight of the macromolecule and Segment B is from 20 to 99.5 percent by weight of the macromolecule.

These segmented copolymers may also be represented by the generic formula showing their monomeric units as follows:

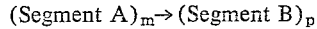

where $a$ and $b$ units are as defined above;
$u$ is at least 4;
$v$ is 0 or an integer such that the weight of $(b)_v$ units represents less than 20% by weight of $[(a)_u(b)_v]_y$ (Segment A);
$w$ is 0 or an integer such that the weight of $(a)_w$ units represents less than 20 percent by weight of

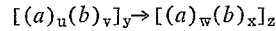

(Segment B);
$x$ is at least 5; and
$y$ and $z$ are integers.

Generally speaking, the segmented copolymers are block and graft copolymers which contain a plurality of segments. In block copolymers the segments are present in a linear molecule; while in graft copolymers the segments of one polymerized species are primarily present as branches on a backbone of the dissimilar polymerized species.

These segmented copolymers are to be distinguished from homogeneous copolymers. The term "homogeneous copolymers" as employed in this specification is one in which the component monomeric units appear in a more or less random or alternating fashion, and such molecules are characterized by the fact that no more than one of the component monomer species is present in long, unbroken sequences in any one macromolecule. Homogenous copolymers embrace substantially all normal copolymer compositions.

The distribution of the monomeric units in such copolymers is governed by the monomer relative reactivity ratios and the monomer concentrations existing at the time of polymerization. The definition of "relative reactivity ratio" is the ratio of the rate at which a growing copolymer chain adds the same monomer which is present as the active terminal unit to the rate at which the same terminal unit adds the dissimilar monomer when the monomers are present at equimolar concentrations.

Segmented copolymers are highly heterogeneous. Whereas the distribution of monomeric units within the individual segments may be governed by the monomer relative reactivity ratios and their concentrations at the time in which the individual segments are formed, these parameters do not affect the frequency or position in which the segments chemically bond within the macromolecule.

Homogeneous copolymers have properties which are generally intermediate between the properties of the homopolymers of the component monomers. The properties of the homogeneous copolymers, as a general rule, change in direct proportion to monomer composition, e.g. styrene-butadiene copolymers. It has been found, however, that having chemically dissimilar segments bonded together within the macromolecule bestows certain uniquely useful properties to the segmented copolymers of this invention which are not possessed by analogous homogeneous copolymers.

These segmented copolymers are useful for imparting repellency to oil and water and resistance to soiling to a variety of substrates. Fibrous, porous and continuous surfaces may be treated with these segmented polymers to achieve these results. Illustrative articles to be treated are textiles, glass, paper, wood, leather, fur, asbestos, bricks, concrete, metals, ceramics, plastics, painted surfaces and plaster. Because of advantages incident to the repellency to oil and water and their resistance to soiling imparted by coating them with the segmented copolymers of this invention, preferred classes of articles to be treated are textile apparel, upholstery, draperies, carpeting, paper bags, cardboard containers, luggage, handbags, shoes, jackets, redwood, pine, cedar, and asbestos siding materials, bricks, concrete, floor or wall tiles, painted or unpainted metals, such as appliances and automobile bodies, masonry, wood, plaster, wallpaper and wallboard surfaces. In the treatment of fabrics, 0.05 to 5% (preferably 0.1 to 1%) by weight segmented copolymer based on the weight of the fabric produces desirable surface properties. Illustrative textiles which can be advantageously treated with the segmented copolymers of this invention are those based on natural fibers, e.g. cotton, wool, mohair, linen, jute, silk, ramie, sisal, kenaf, etc. and those based on synthetic fibers, e.g. rayon, acetate, acrylic, polyester, saran, azylon, nytril, nylon, spandex, vinal, olefin, vinyon and glass fibers. (The above designations of synthetic fibers are the proposed generic terms set up by the Federal Trade Commission.) The treatment of these fabrics with the compositions of this invention imparts no adverse effect on the hand of the fabric and in some cases has a softening effect, thereby improving the hand.

The segmented copolymers of this invention may be applied as a surface treatment by known methods of coating such as spraying, brushing or impregnation from an aqueous or organic solvent dispersion or an organic solvent solution of the segmented copolymer. The segmented copolymer may be used as the sole component in the treating vehicle or as a component in a complex multi-ingredient formulation. For instance, excellent water and oil repellency and soil resistance is obtained on textile fabrics which are treated simultaneously with the segmented copolymer and conventional finishes, such as mildew preventatives, moth resisting agents, crease resistant resins, lubricants, softeners, sizes, flame retardants, antistatic agents, dye fixatives, and water repellents. In the treatment of paper the segmented copolymer may be present as an ingredient in a wax, starch, casein, elastomer or wet strength resin formulation. By mixing the segmented copolymer in an aqueous or oil type paint formulation it may be applied effectively to unpainted or previously painted asbestos siding, wood, metal and masonry. In the treatment of floors and tile surfaces and like substrates the segmented copolymer may be applied by incorporating it in a wax based emulsion or solution.

In addition to oil and water repellency and soil resistance properties, the segmented copolymers may be used to impart lower surface adhesion values and lower coefficients of friction to substrates. Accordingly, they may also be used as mold release agents and related applications.

The segmented copolymers of this invention can, in general, be distinguished from the three classes of polymeric materials containing $a$ monomer units known to the prior art (namely homopolymers, mixed polymers and homogeneous copolymers) by reference to their difference in physical and solubility characteristics and their effectiveness in surface treatments. The fluorine-containing homopolymers are characterized by their solubility in fluorine-containing solvents such as the fluoroalkanes, fluorochloroalkanes, fluoroalkyl substituted aromatics, and alkyl esters of perfluoroalkanoic acids, and their general insolubility in common organic solvents such as aromatics, chlorinated alkanes and aromatics, ketones, esters, and ethers. These solubility characteristics greatly limit their application in solvent coating formulations because of the high cost and in many cases the high volatility of the fluorinated solvents. These homopolymers are also characterized by the effective oil and water repellency and soil resistant properties which they impart to surfaces. However, economical utilization of the fluorine-containing homopolymers is restricted in many applications by their relatively high cost and the necessity for using about 1 percent by weight of the homopolymer on the surfaces to obtain effective treatments.

The mixed polymers, i.e. a mechanical blend or a mixture of dispersions of a homopolymer containing $a$ units with a polymer containing only $b$ units, are characterized by the fact that they are incompatible mixtures and cannot be codissolved in any useful treating solvent. In some cases, these mixed polymers give effective surface treatments when applied from aqueous dispersions, but surfaces treated with the mixed polymer are characterized by relatively poor durability characteristics as compared to surfaces treated with the segmented copolymers of this invention.

The homogeneous copolymers of $a$ and $b$ units have physical and solubility properties greatly different from the homopolymer of $a$ units. However, when a sufficient amount of $b$ units are incorporate into the copolymer to bring about a material cost reduction or any significant improvement in physical or solubility properties, a noticeable impairment of the oleophobic and hydrophobic properties and their degree of durability on treated surfaces results.

The segmented copolymers are characterized by the fact that they give effective surface treatments over a wide composition range. The segmented copolymers are further characterized by the fact that desired solubility and physical properties can be obtained by varying the $b$ units in the segments of the macromolecule. Thus, certain segmented copolymers comprising substantial weights of segments based on butadiene or chloroprene are soluble in aromatic solvents and chlorinated alkanes. Moreover, these products are characterized by high degrees of flexibility and abrasion resistance. The use of styrene as the base for the formation of B segments provides a product having increased hardness and softening temperature and solubility in benzene. The use of methyl vinyl ketone in the formation of B segments gives a product of great toughness and solubility in dioxane and acetone.

Because of the wide latitude available in the selection of one or more $b$ monomers suitable for the formation of at least one B segment in the macromolecules of this invention, it becomes apparent that segmented copolymers can be made which have essentially any desired physical or solubility property built into the compound. The inclusion of A segments comprising $a$ monomer units in such macromolecules imparts surface characteristics to the compounds which are superior in many respects to those shown by the analogous fluorine-containing homopolymers. For example, the durability of the surface characteristics of fabrics treated with the segmented copolymers of this invention to wear, dry cleaning, and laundering are greatly enhanced.

The cost of surface treatments is almost directly related to the percent of fluorine derived from the $a$ units deposited on the surface. Since the segmented copolymers inherently contain less fluorine than the analogous homopolymers of the $a$ units and can frequently be employed at substantially lower treatment levels, a material savings in cost can be accomplished by the practice of this invention.

The desired surface characteristics of the segmented copolymers of this invention become evident when the weight of A segments within the macromolecule constitutes as little as 0.5 percent by weight of the total molecular weight. The advantages of this novel class of compounds as contrasted to the homopolymer of $a$ units disappears when the weight of the A segments approaches about 80 percent of the total molecular weight. A preferred series of compositions for the treatment of fabrics reside in the range where the A segment constitutes 30–60 percent by weight of the macromolecule.

The segmented copolymers of this invention can be prepared by several processes. In general, the conditions required for their preparation are the formation of either A or B segments as a prepolymer which either participates by initiation or chain transfer mechanisms in the subsequent polymerization reaction in which the dissimilar segments are formed, or is chemically bonded to the previously formed dissimilar segments in a subsequent chemical reaction. The prepolymer may be a polymer in which one or more of the monomeric units contain functional groups which participate in initiation or chain transfer mechanisms in polymerization reactions.

Conjugated dienes are especially useful for providing $b$ units since B segments based on conjugated dienes readily combine with A segments during the formation of the A segments. Polymers which inherently do not tend to participate in further polymerization reactions may be employed as prepolymers by incorporation, via copolymerization, of a monomer having functional groups which participate by providing initiation or chain transfer sites. The functional group may also be incorporated by chemical or physical modification of the prepolymer, such as by peroxidation, bromination, mastication and irradiation.

Usually, the prepolymer is prepared in the absence of the dissimilar monomer as a first step in the formation of the segmented copolymers. However, in cases where the $a$ and $b$ monomers have widely different relative reactivity ratios (e.g. one monomer has a value of greater than 1, while the other monomer has a value of less than 0.1) and the more reactive monomer forms a segment inherently containing functional groups capable for participating in subsequent polymerization reactions, then such monomers can be polymerized simultaneously to produce the segmented copolymers of our invention. Thus, chloroprene and

having relative reactivity ratios of about 16 and 0, respectively, can be simultaneously copolymerized in the weight ratios of 25-75 percent chloroprene to 75-25 percent

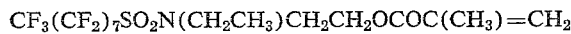

(mol ratios=71-96% chloroprene: 29-4%

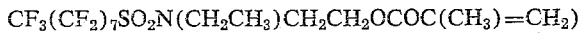

to produce segmented copolymers which are particularly valuable. The segmented copolymers produced in these reactions consist of A segments containing at least 80 percent by weight of

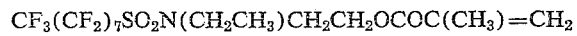

units and B segments containing at least 80 percent by weight of chloroprene units. The fact that these products are segmented copolymers is demonstrated by their solubility and surface characteristics. When prepared with mercaptan modifiers to avoid polymer crosslinking, the products are completely soluble in xylene hexafluoride, benzene and chlorinated alkanes. (These same solvents can be used to separate quantitatively mixtures of the homopolymers of chloroprene and

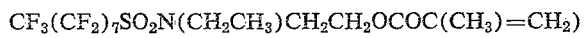

In addition, the fabric treating results of the segmented copolymer made in this direct fashion are virtually indistinguishable from the results obtained with a segmented copolymer made by polymerizing

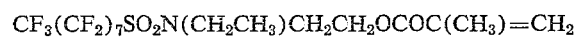

in the presence of the prepolymer of chloroprene.

The general structural formula of the fluorine-containing monomers employed in this invention is $R_fP$ where $R_f$ is a perfluoroalkyl radical of the formula $C_nF_{2n+1}$ where $n$ is at least 4 and less than 20 (preferably 5 to 10) and P is a radical containing a polymerizable group. Illustrative types of these fluorine-containing monomers are the acrylate, methacrylate and $\alpha$-chloro acrylate esters of N-alkanol perfluoroalkane sulfonamides, 1,1-dihydroperfluoroalkanols, omega-perfluoroalkyl alkanols and 1,1,3-trihydroperfluoroalkanols, 1,1-dihydroperfluoroalkyl acrylamides, 1,1-dihydroperfluoroalkyl vinyl ethers, vinyl perfluoroalkyl ketones, allyl perfluoroalkyl ketones, 1-perfluoroalkenes, 2-perfluoroalkyl ethylenes, 1,1-dihydroperfluoroalkene-1, perfluoroalkyl substituted styrenes, and vinyl and allyl esters of perfluoroalkanoic acids.

Illustrative ethylenically unsaturated monomers which may be employed to form a segmented copolymer with the above fluorine-containing monomers are ethylene, vinyl acetate, vinyl chloride, vinyl fluoride, vinylidene chloride, vinylidene fluoride, vinyl chloroacetate, acrylonitrile, vinylidene cyanide, styrene, alkylated styrenes, sulfonated styrenes, halogenated styrenes, acrylic acid and alkyl esters thereof, methacrylic acid and alkyl esters thereof, alpha-chloroacrylic acid and alkyl esters thereof, methacrylonitrile, acrylamide, methacrylamide, vinyl carbazole, vinyl pyrrolidone, vinyl pyridine, vinyl alkyl ethers, vinyl alkyl ketones, butadiene, chloroprene, fluoroprene and isoprene. Functional groups which will participate as initiating or chain transfer sites include thiol, disulfide, chloro, bromo and iodo groups, peroxide and hydroperoxide groups, and activated hydrogen atoms (e.g. tertiary allylic hydrogens).

Generally speaking, the segmented copolymers of this invention contain a mol ratio of $b$ units to $a$ units of at least 5 to 2 (preferably at least 5 to 1), and the ethylenically unsaturated monomers are combined in segments which contain at least 5 consecutive units of the ethylenically unsaturated monomeric units (preferably at least 20).

The segmented copolymers of this invention may be prepared in an emulsion system to produce latices which may be utilized directly to treat substrates in accordance with the teachings of this invention. The copending application of Sherman and Smith, S.N. 650,294, filed August 3, 1957, now Patent No. 3,062,765, describes a process for the emulsion polymerization which may be employed to prepare the latices. In cases where the copolymers are utilized in an organic solvent system, they may be polymerized in the solvent or recovered from the latex, such as by coagulation, and dissolved in the solvent. Illustrative solvents are perchloroethylene, benzene, acetone, butyl acetate and dioxane.

Anionic, cationic, or non-ionic emulsifiers and blends of non-ionic emulsifiers with either anionic or cationic emulsifiers may be incorporated in the latices of this invention. The blends of cationic and non-ionic emulsifiers have been found to be useful where the composition is employed to treat textiles and like substrates.

Antioxidants may also be added to the polymer compositions. These antioxidants function primarily to stabilize the polymer itself and are most useful in segmented copolymers based on conjugated dienes which otherwise tend to oxidize and discolor and may adversely affect the substrate.

In the treatment of fabrics, the segmented copolymers of this invention may be applied in admixture with other treating agents, such as crease resisting resins, sizes, softeners, and water repellents. Known treating agents of these classes are as follows.

Crease resisting resins: urea-formaldehyde resins, ethylene urea-formaldehyde resins, melamine-formaldehyde resins, triazone-formaldehyde resins, epoxy resins, and polyglycol acetals.

Sizes: starch, casein, glue, polyvinyl alcohol, polyvinyl acetate, methyl cellulose, carboxymethyl cellulose.

Softeners: polyethylene glycols, polyethylene, dimethyl polysiloxanes, amines and amides derived from fatty acids and ethylene oxide condensation products of such amines and amides.

Water repellents: waxes, aluminum salts of fatty acids, silicone resins, chromium complexes of fatty acids, N-alkyl amidomethyl pyridinium salts, and melamine-formaldehyde resin condensates with amides from fatty acids.

This invention may be illustrated further by reference to the following examples in which all "parts" are expressed as parts by weight and all "percentages" are expressed as percent by weight, unless specified otherwise.

The fluorine-containing monomers, procedure for preparing the segmented copolymers, and the method for evaluating their effectiveness were as follows except as otherwise indicated:

The fluorinated monomers employed in the examples were:

I. $CF_3(CF_2)_7SO_2N(CH_3)CH_2CH_2OCOC(CH_3)=CH_2$
II. $CF_3(CF_2)_7SO_2N(CH_2CH_3)$
$CH_2CH_2OCOC(CH_3)=CH_2$
III. $CF_3(CF_2)_7SO_2N(CH_2CH_2CH_3)$
$CH_2CH_2OCOCH=CH_2$
IV. $CF_3(CF_2)_4CH_2OCOC(CH_3)=CH_2$
V. $CF_3(CF_2)_7(CH_2)_{11}OCOCH=CH_2$

Monomers I to III are shown in Ahlbrecht, Brown and Smith, U.S. Patent No. 2,803,615.

Monomer IV is shown in Ahlbrecht, Reid and Husted, U.S. Patent No. 2,642,416.

Monomer V is shown in the copending application of Ahlbrecht and Smith, Serial No. 677,229, filed August 9, 1957, now abandoned, but refiled as continuation S.N. 274,920, now Patent No. 3,102,103.

The procedure employed to prepare the polymers in ampoules was the following sequence of steps:

(a) Charging the reactants to a heavy-walled Pyrex glass ampoule.

(b) Removing oxygen from the ampoule by freezing the contents of the ampoule in liquid air, and evacuating it to a pressure of less than 0.01 mm. mercury.

(c) Sealing the degrassed ampoule.

(d) Warming the sealed ampoule until the contents were melted.

(e) Polymerizing the contents by placing the ampoule in an end-over-end rotor in a water bath at 50° C. for 16 hours.

The procedure employed to prepare the polymers in screw cap bottles equipped with self-sealing rubber gaskets was to charge the reactants and to flush the bottle with a stream of oxygen-free nitrogen gas prior to sealing the bottles and to polymerize the contents in an end-over-end rotator in a water bath at 50° C. for the specified period of time.

The reaction mixture in each instance contained 100 parts of monomer, 126 part of distilled water, 54 parts acetone, 0.2 part potassium persulfate, and emulsifier and mercaptan modifier, if any, as indicated.

The cotton fabrics were treated by immersing them in an aqueous pad bath containing a dimethylol ethyleneurea resin, an alkanolamine hydrochloride and polymers in the concentrations indicated and thereafter curing them for 10 minutes at about 150° C. The wool fabrics were treated by immersing them in an aqueous pad bath containing 4% isobutyl alcohol and 0.25% sodium acetate, and polymers at the concentrations indicated, and thereafter curing them for 10 minutes at about 150° C.

The water repellency of the treated fabrics was measured by Standard Test No. 22–52, published in the 1952, Technical Manual and Yearbook of the American Association of Textile Chemists and Colorists, vol. XXVIII, page 136. The "spray rating" is expressed on a 0 to 100 scale, wherein 100 is the highest possible rating.

The oil repellency test is based on the different penetrating properties of two hydrocarbon liquids, mineral oil and n-heptane. Mixtures of these two liquids are miscible in all proportions and show penetrating properties which increase with an increase in the n-heptane content of the mixture.

The oil repellency rating numbers were chosen to correspond with the A.A.T.C.C. Standard Spray Ratings which are now in use for testing water repellent finishes.

| Oil Repellency Rating | Percent Heptane [1] | Percent Mineral Oil [1] |
|---|---|---|
| 100(+) | 60 | 40 |
| 100 | 50 | 50 |
| 90 | 40 | 60 |
| 80 | 30 | 70 |
| 70 | 20 | 80 |
| 50 | 0 | 100 |
| 0 | | [2] |

[1] Percent by volume.
[2] No holdout to mineral oil.

To measure oil repellency of a treated fabric, 8" x 8" swatches are cut and placed flat on a table. A drop of each mixture is gently placed onto the surface of the fabric. The number corresponding to that mixture containing the highest percentage heptane which does not penetrate or wet the fabric after three minutes contact is considered the oil repellency rating of the sample.

The treated fabric samples were dry cleaned three times with perchloroethylene containing a soap in commercial dry cleaning equipment. Because of the adverse effect due to the soap residue on the dry cleaned fabrics, the spray rating tests were omitted.

The treated cotton fabrics were laundered three times in a 9 pound load, agitating, automatic washer machine using water at 140° F. and a commercial detergent, dried for 20 minutes at 190° F., and ironed at 325° F. before being tested and recorded as the "washing rating."

EXAMPLE I

This example shows the preparation of segmented and homogeneous copolymers of monomer II and methyl vinyl ketone.

A. *Segmented copolymer of monomer II and methyl vinyl ketone*

Methyl vinyl ketone was polymerized to 84% conversion in 20% dioxane solution in admixture with benzoyl peroxide for 45 hours at 50° C. The resulting polymethyl vinyl ketone (3.3 grams) and 3.3 grams of monomer II were charged to a heavy-walled Pyrex glass ampoule as a solution in 22 grams of dioxane. The contents were frozen in liquid air. The tube was then evacuated and sealed. The sealed ampoule was attached to a rocking platform and subjected to ultraviolet irradiation from a 275 watt sunlamp placed 12 inches above the ampoule for 30 hours at 75° C. The reaction product was a clear viscous solution and a solid phase. The solution was added to methanol to precipitate a polymer which after washing with methanol and drying in a vacuum at 60° C. weighed 2.5 grams and was a hard, horny polymer. Elemental analysis of this polymer showed that 7.5% monomer II had been grafted to the polymethyl vinyl ketone. (The homopolymer of monomer II is insoluble in dioxane.)

Aluminum panels coated with this segmented copolymer from a dioxane solution had excellent oil and water repellency.

A 1% solution of the segmented copolymer in dioxane had a surface tension of 24.2 dynes/cm., as measured with a Du Nouey Tensiometer. The known surface tension of dioxane is 36.9 dynes/cm.

B. *Homogeneous copolymers of monomers II and methyl vinyl ketone*

Homogeneous copolymers of methyl vinyl ketone and monomer II were prepared in an ampoule by charging 10 grams of the monomer mixture, 20 grams acetone and 0.08 gram benzoyl peroxide and reacting the mixture for 20 hours. The monomer mixtures contained (a) 95 to 5, (b) 75 to 25, and (c) 50 to 50 parts by weight of methyl vinyl ketone and monomer II, respectively, for copolymers A, B and C. The resulting reaction mixtures were all clear, viscous solutions from which the copolymers were precipitated with methanol, washed and dried. The properties of he homogenous copolymers were as follows:

| Homogeneous Copolymer | Physical Characteristics | Percent Monomer II Combined | Surface Tension [1] |
|---|---|---|---|
| A | Hard, horny | 3.8 | 36.2 |
| B | do | 26 | 32.5 |
| C | Hard, brittle | 50 | 26.7 |

[1] Dynes per centimeter of a 1% solution in dioxane as measured at 25° C. using a DuNouey Tensiometer.

It is seen from the surface tension data that the segmented copolymer having 7.5% combined monomer II actually has a higher degree of surface activity than the homogeneous copolymer containing 50% combined monomer II.

EXAMPLE II

This example illustrates the preparation of homogenous and segmented copolymers of monomer II and butadiene.

**A. *Homogenous copolymer of 96 parts monomer II and 4 parts butadiene***

Monomer II (9.6 grams) and butadiene (0.4 gram) were polymerized in an ampoule as described above in the presence of 0.5 gram $C_8F_{17}SO_2NH(CH_2)_3N(CH_3)_2 \cdot HCl$ (emulsifier A) and 0.03 gram tertiary dodecyl mercaptan. The resulting latex, which represented 83% conversion to stably emulsified copolymer, was employed to treat cotton and wool fabrics in a pad bath at the indicated concentration. The observed results are tabulated in Table I. The product obtained in this experiment was a powdery resin which was insoluble in benzene.

It will be noted in the table that the initial repellency properties of the fabrics treated with this product were excellent and the repellency properties remained after 3 commercial dry cleanings.

**B. *Homogeneous copolymer of 50 parts monomer II and 50 parts butadiene***

A 4 ounce screw cap bottle was charged with 12.5 grams of monomer II, 31.5 grams water, 13.5 grams acetone, 1.25 grams emulsifier A, 0.05 gram potassium persulfate, 0.075 gram tertiary dodecyl mercaptan, and 0.075 gram n-octyl mercaptan. Butadiene was then added in excess and the bottle sealed when all but 12.5 grams of butadiene had flashed off. After a reaction period in a water bath for 18 hours at 50° C., a milky, stable latex containing 22.4 percent polymer solids (63% conversion to a suitably emulsified copolymer) was obtained.

A clear, tacky, flexible rubber was recovered from the latex which was soluble in both xylene hexafluoride and benzene and gave clear, viscous solutions in each.

The latex was used to treat wool fabrics and results obtained are tabulated in Table I. Excellent oil ratings were obtained but spray ratings were poor and the treatment obtained from this product was not durable to commercial dry cleaning.

**C. *Segmented copolymer of 50 parts monomer II and 50 parts polybutadiene***

A 4 ounce screw cap bottle was charged with 31.5 grams water, 4.7 grams acetone, 1.25 grams emulsifier A, 0.05 gram potassium persulfate, 0.125 gram tertiary dodecyl mercaptan, and 0.125 gram n-octyl mercaptan. Butadiene was then added in excess and the bottle sealed when all but 12.5 grams of butadiene had flashed off. After a reaction period in a water bath for 25.5 hours at 50° C., 97 percent conversion to polybutadiene having a molecular weight exceeding 2500 was accomplished.

Monomer II (12.5 grams) and 8.8 grams acetone were added to the latex. After an additional reaction period in a water bath for 15.5 hours at 50° C., a stable, milky latex containing 29 percent polymer solids, representing 81% total conversion to latex polymer, was obtained.

A soft, white, opaque, tack-free, putty-like solid polymer was separated from the latex by coagulation with methanol. Over 90% of the polymer was soluble in benzene. Polybutadiene, as made by the above process, is completely soluble in benzene and completely insoluble in xylene hexafluoride, whereas the homopolymer of monomer II is completely insoluble in benzene and completely soluble in xylene hexafluoride.

By analysis it was determined that the polymer recovered from the benzene solution contained 54 percent combined monomer II units bonded to the polybutadiene pre-polymer. In this segmented copolymer approximately 50% by weight of the A segment was fluorine derived from the perfluorooctyl group of monomer II.

This segmented copolymer, when applied to wool fabrics, imparted good initial repellency properties which were durable to dry cleaning as shown in Table I and the results were clearly superior to those obtained with the homogenous copolymer of the same monomer weight ratios as described in IIB above.

**D. *Segmented copolymer having 50 parts homogeneous copolymer A segments (96 parts monomer II and 4 parts butadiene) and 50 parts polybutadiene B segments***

A 16 ounce screw cap bottle was charged with 112.5 grams water, 37.5 grams acetone, 2.5 grams emulsifier A, 0.1 gram potassium persulfate, and 0.2 gram tertiary dodecyl mercaptan. Butadiene was then added in excess and the bottle sealed when all but 50 grams of the butadiene had flashed off. After reaction in a 50° C. water bath for 23.5 hours, 80 percent conversion to polybutadiene was accomplished.

To 135 grams of this latex (30 grams polybutadiene) in a 16 ounce screw cap bottle were added 28.8 grams monomer II, 16.2 grams acetone, 48.8 grams water, 0.03 gram potassium persulfate, and 0.06 gram tertiary dodecyl mercaptan. Butadiene was then added in excess and the bottle sealed when all but 1.2 grams of butadiene had flashed off. After reaction in a water bath at 50° C. for 19 hours, 89% total conversion to stably emulsified product containing segmented copolymer was obtained. The product, which was soluble in benzene, was similar in appearance to the 50:50 segmented copolymer described in IIC above.

When this segmented copolymer was applied to wool fabrics, results were obtained which were equivalent to those obtained with the 50:50 segmented copolymer (IIC above) and the 96:4 homogeneous copolymer (IIA above) and greatly improved over those obtained with the 50:50 homogeneous copolymer (IIB above).

The results of this example show that the A segment can be a homogeneous copolymer containing the requisite amount of *a* units.

TABLE I

| Polymer | Fabric | Percent Polymer in Bath | Initial Rating Oil | Initial Rating Spray | Dry Cleaning Rating, Oil |
|---|---|---|---|---|---|
| A | Wool gabardine | 0.5 | 100+ | 100 | 100 |
|   | Wool flannel | 0.5 | 100 | 100 | 100 |
| B | Wool gabardine | 0.5 | 100+ | 80 | 0 |
|   | Wool flannel | 0.5 | 100+ | 70 | 0 |
| C | Wool gabardine | 0.5 | 100+ | 100 | 100 |
|   | Wool flannel | 0.5 | 100+ | 100 | 100 |
| D | Wool gabardine | 0.5 | 100+ | 100 | 100 |
|   | Wool flannel | 0.5 | 100+ | 100 | 100 |

EXAMPLE III

This example demonstrates that the segmented copolymers possess properties different from either the fluorinated homopolymer or mixtures of homopolymers of the fluorinated and non-fluorinated components.

A. Homopolymer of monomer II

Monomer II (10 grams) was polymerized in an ampoule as described above in the presence of 0.5 gram of emusifier A to form a homopolymer which was a brittle resinous material. It is noted in Table II that this homopolymer gives cotton and wool treatments having inferior initial oil repellency and inferior durability to dry cleaning and laundering when compared to the segmented copolymer described in Table II. The cotton twills were treated in a pad bath containing no additive.

B. Mixed homopolymers of monomer II and chloroprene

Blends of polychloroprene latices and latices of the homopolymer of monomer II were prepared. Fabrics treated with these blends, as indicated by the observed values listed in Table II, had oil and spray ratings considerably lower than fabrics treated with a segmented copolymer of chloroprene and monomer II in a similar manner and at substantially the same concentration of perfluoroalkyl groups in the latices. The pad baths employed to treat the wool fabrics contained 0.25% polychloroprene and 0.25% of the homopolymer of monomer II and those employed to treat the cotton fabric containing 0.5% polychloroprene and 0.5% homopolymer of monomer II.

C. Segmented copolymer of monomer II and chloroprene

A 250 milliliter 3-neck flask fitted with a stirrer and equipment for purging with oxygen-free nitrogen was charged as follows:

| | Grams |
|---|---|
| Chloroprene | 25 |
| Distilled water | 63 |
| Acetone | 27 |
| $C_8F_{17}SO_2NH(CH_2)_3N^+(CH_3)_3Cl^-$ (emulsifier B) | 2.5 |
| $K_2S_2O_8$ | 0.1 |

After 2 hours reaction at 50° C. 86% of the chloroprene was converted to stably emulsified polymer. Monomer II (25 grams) was then added to the flask and the reaction continued for 4.5 hours at which time 83% of the total monomer was converted to stably emulsified latex polymer containing segmented copolymer.

Table II shows the oil and spray ratings for this segmented copolymer when applied to cotton fabrics from a pad bath containing 1% polymer, urea-formaldehyde resins and organic salt catalyst. The superior performance obtained with this product when compared with the mixed homopolymers of monomer II and chloroprene clearly demonstrates that a segmented copolymer was obtained.

D. Segmented copolymer of monomer II and chloroprene

Chloroprene (5 grams) and 5 grams of monomer II were polymerized in an ampoule as described above in the presence of 0.5 gram of emulsifier A and 0.02 gram of tertiary dodecyl mercaptan to form a product representing 77% conversion to stably emulsified polymer containing segmented copolymer. This material was employed to treat cotton, wool and nylon fabrics as shown in Table II. Cotton twill cloth (1) was treated in a pad bath containing no additive. Cotton twill cloth (2) was treated in a pad bath containing additives. The wool and nylon fabrics were treated in an aqueous pad bath containing 4% isobutyl alcohol and 0.12% sodium acetate.

The performance of this segmented copolymer (IIID) on fabrics is virtually indistinguishable from the segmented copolymer IIIC, and far superior to IIIA and IIIB. No durability was observed with the treatment based on the homopolymers of Examples IIIA and IIIB but the durability of the treatments based on the products in IIIC and IIID was excellent.

TABLE II

| Polymer | Fabric | Percent Polymer in Bath | Initial Rating | | Dry Cleaning Rating, Oil | Washing Rating | |
|---|---|---|---|---|---|---|---|
| | | | Oil | Spray | | Oil | Spray |
| A | Cotton twill | 1 | 70 | 100 | 0 | 0 | 0 |
| | Wool flannel | 1 | 90 | 100 | 0 | | |
| | Wool polyester blend | 1 | 90 | 100 | 0 | | |
| | Wool gabardine | 1 | 100 | 100 | 0 | | |
| B | Wool gabardine | 0.5 | 100 | 100 | 0 | | |
| | Wool flannel | 0.5 | 90 | 90 | 0 | | |
| | Cotton print cloth | 1 | 70 | 100 | 0 | 0 | 0 |
| C | Cotton twill | 1 | 100 | 100 | 90 | 90 | 100 |
| | Cotton print cloth | 1 | 100 | 100 | 100 | 90 | 100 |
| D | Cotton twill (1) | 0.5 | 90 | 100 | 90 | 70 | 90 |
| | Cotton twill (1) | 1 | 90 | 100 | 90 | 80 | 100 |
| | Cotton twill (2) | 1 | 90 | 100 | 90 | 80 | 100 |
| | Wool gabardine | 0.5 | 100+ | 100 | 100+ | | |
| | Wool flannel | 0.5 | 100+ | 100 | 100+ | | |
| | Wool polyester blend | 0.5 | 100+ | 100 | 100+ | | |
| | Nylon | 0.5 | 100 | 100 | | | |

EXAMPLE IV

A series of products containing segmented copolymers were prepared as described above by polymerizing chloroprene and monomer II in a heavy walled Pyrex glass ampoule in the presence of 0.5 gram of emulsifier B to form latices representing approximately 90% conversion of the monomers charged to stably emulsified polymer. The monomer charges to the ampoule were as follows:

| Charge | Monomer II (grams) | Chloroprene (grams) |
|---|---|---|
| A | 5 | 5 |
| B | 3.5 | 6.5 |
| C | 3 | 7 |
| D | 2.5 | 7.5 |
| E | 2 | 8 |

The product in each case was an opaque, tough, tack-free elastomer.

Cotton fabrics were treated with these latices and the observed results are tabulated in Table III. It is noted in this example that, although IVA gave the best overall properties, A, B, C and D all gave excellent initial treatments and showed significant degrees of durability to dry cleaning and laundering.

TABLE III

| Polymer | Fabric | Percent Polymer in Bath | Initial Rating | | Dry Cleaning Rating, Oil | Washing Rating, Oil |
|---|---|---|---|---|---|---|
| | | | Oil | Spray | | |
| A | Cotton twill | 1 | 100 | 100 | 100 | 80 |
| | Cotton print cloth | 1 | 100 | 100 | 90 | 80 |
| B | Cotton twill | 1 | 100+ | 100 | 90 | 80 |
| | Cotton print cloth | 1 | 100+ | 100 | 80 | 80 |
| C | Cotton twill | 1 | 100+ | 100 | 70 | 80 |
| | Cotton print cloth | 1 | 100+ | 100 | 70 | 80 |
| D | Cotton twill | 1 | 100 | 100 | 50 | 70 |
| | Cotton print cloth | 1 | 100+ | 100 | 50 | 70 |
| E | Cotton twill | 1 | 100 | 80 | 0 | 70 |
| | Cotton print cloth | 1 | 100 | 90 | 0 | 70 |

EXAMPLE V

Chloroprene (5 grams) and 5 grams of monomer II were polymerized in an ampoule as described in the presence of 0.5 gram of emulsifier B and 0.04 gram tertiary dodecyl mercaptan to give 83% conversion to a stably emulsified product containing segmented copolymer. This product was employed to treat cotton fabrics at 1% concentration and the test results are shown below. Durability results in this case were observed after three commercial dry cleanings and 15 launderings to be as follows:

| Fabric | Initial Rating | | Dry Cleaning Rating, Oil | Washing Rating | |
|---|---|---|---|---|---|
| | Oil | Spray | | Oil | Spray |
| Cotton twill | 100 | 100 | 100 | 80 | 100 |
| Cotton print cloth | 100 | 100 | 100 | 80 | 100 |

EXAMPLE VI

This example illustrates that segmented copolymer compositions may be employed to treat fabrics from an organic solvent solution.

A 5 gallon glass-lined kettle which has been flushed with oxygen-free nitrogen was charged as follows:

| | Grams |
|---|---|
| Monomer II | 1770 |
| Emulsifier A | 177 |
| n-Octyl mercaptan | 10.7 |
| Tert-dodecyl mercaptan | 10.6 |
| Distilled water | 4460 |
| Acetone | 1910 |

The kettle was then flushed with nitrogen again and chloroprene (1770 grams) and potassium persulfate ($K_2S_2O_8$) (7.1 grams) added with stirring. After maintaining the kettle at 50° C. for 9 hours, 9360 grams of a latex containing 29.5% solids was obtained. The latex was coagulated with methanol, dried and washed to yield a product containing segmented copolymer which was soluble in both benzene and xylene hexafluoride.

The polymer was dissolved in 1,1,1-trichloroethane as a 0.15% solution and 0.25% by weight of the polymer deposited on the fabrics by coating them with this solution. The fabrics were cured for 15 minutes at 71° C. The measured oil and spray ratings of these fabrics were as follows:

| Fabric | Initial Rating | |
|---|---|---|
| | Oil | Spray |
| Cotton twill | 100+ | 90 |
| Wool gabardine | 100+ | 100 |
| Wool flannel | 100+ | 100 |

EXAMPLE VII

Chloroprene (5 grams) and monomer I (5 grams) were polymerized in an ampoule as described above in the presence of 0.5 gram of emulsifier A and 0.04 gram of tertiary dodecyl mercaptan. The resulting latex, which represented a 78% conversion of the monomers to a stably emulsified product containing segmented copolymer, was employed to treat cotton and wool fabrics in a pad bath at the indicated concentrations. The observed experimental results were as follows:

| Fabric | Percent Polymer in Bath | Initial Rating | | Dry Cleaning Rating, oil |
|---|---|---|---|---|
| | | Oil | Spray | |
| Cotton twill | 1 | 100+ | 70 | 100 |
| Wool gabardine | 0.5 | 100+ | 100 | 100 |
| Wool flannel | 0.5 | 100+ | 100 | 100 |
| Wool polyester blend | 0.5 | 100+ | 100 | 100 |

EXAMPLE VIII

This example demonstrates the superior properties of the segmented copolymer over the homopolymer of the fluorine-containing monomer, particularly in regard to dry cleaning durability.

A. Homopolymer of monomer III

Monomer III (10 grams) was polymerized in an ampoule as described above in the presence of 0.5 gram emulsifier A. The resulting latex represented 90% conversion to stably emulsified product. The homopolymer was a soft, flexible plastic.

Wool fabrics were treated with this polymer at pad bath concentrations of 0.5 and 0.25%. The latter level is comparable in the amount of fluorine-containing polymer used with 0.5% of the 50:50 monomer III:chloroprene segmented copolymer described below. Results are tabulated in Table IV.

B. *Segmented copolymer of monomer III and chloroprene*

Chloroprene (5 grams) and 5 grams of monomer III were polymerized in a heavy walled Pyrex glass ampoule as described above in the presence of 0.5 gram of emulsifier A and 0.02 gram of tertiary dodecyl mercaptan. The resulting latex, which represented an 83% conversion of the monomers to a stably emulsified product containing segmented copolymer, was employed to treat wool fabrics and the measured results tabulated in Table IV. The copolymer was an opaque, tack-free rubber.

TABLE IV

| Polymer | Fabric | Percent Polymer in Bath | Initial Rating | | Dry Cleaning Rating, Oil |
|---|---|---|---|---|---|
| | | | Oil | Spray | |
| A | Wool gabardine | 0.5 | 100+ | 100 | 80 |
| | Wool flannel | 0.5 | 100+ | 90 | 90 |
| | Wool polyester blend | 0.5 | 100 | 100 | 100 |
| | Wool gabardine | 0.25 | 100+ | 100 | 80 |
| | Wool flannel | 0.25 | 100 | 90 | 70 |
| | Wool polyester blend | 0.25 | 100 | 100 | 80 |
| B | Wool gabardine | 0.5 | 100+ | 100 | 100 |
| | Wool flannel | 0.5 | 100+ | 100 | 100 |
| | Wool polyester blend | 0.5 | 100 | 100 | 100 |

EXAMPLE IX

This example also illustrates the superiority of the segmented copolymers over the homopolymer of an *a* monomer, particularly in regard to dry cleaning and laundering durability.

A. *Homopolymer of monomer IV*

Monomer IV (10 grams) was polymerized in an ampoule as described above in the presence of 0.5 gram emulsifier A. The product was a brittle, resinous material. The results obtained by treating cotton and wool fabrics are shown in Table V.

B. *Segmented copolymer of 50 parts monomer IV and 50 parts chloroprene*

A product containing segmented copolymer was prepared by polymerizing 12.5 grams of monomer IV and 12.5 grams chloroprene in a 4 ounce screw cap bottle in the presence of 1.25 grams emulsifier A to a latex representing 99% conversion to stably emulsified polymer. The product was an opaque, tough, tack-free rubber. Cotton and wool fabrics were treated with the polymer and the results are tabulated in Table V.

C. *Segmented copolymer of 25 parts monomer IV and 75 parts chloroprene*

Monomer IV (6.3 grams) and 18.8 grams of chloroprene were polymerized in the same manner as the copolymer in B above to a latex representing 93% conversion to stably emulsified product containing segmented copolymer. The polymer was similar in appearance to the copolymer B above. Results obtained on cotton and wool fabrics are shown in Table V.

EXAMPLE X

Monomer V (1 gram) and 1 gram of chloroprene were polymerized in an ampoule as described above in the presence of 0.1 part of emulsifier A. The results obtained by treating cotton fabrics with these segmented copolymers at ½% concentration were as follows:

| Fabric | Initial Rating | | Washing Rating | |
|---|---|---|---|---|
| | Oil | Spray | Oil | Spray |
| Cotton twill | 100+ | 100 | 90 | 80 |
| Cotton print cloth | 100+ | 100 | 90 | 80 |

EXAMPLE XI

A natural rubber latex containing 62% solids was aerated by tumbling a half-filled bottle of a latex for two days and opening the bottle periodically to introduce air. Hydroperoxide groups were introduced into the rubber macromolecule in this manner.

The aerated natural rubber latex (equivalent to 20 grams of rubber solids), 20 grams of monomer II, 50.4 grams water, 21.6 grams acetone, 0.002 gram ferrous sulfate and 0.2 gram triethylenetetramine were charged to a 16 ounce screw cap bottle. The bottle was flushed with oxygen-free nitrogen, sealed and shaken for 10 minutes at room temperature whereupon monomer II polymerized and the latex coagulated. The reaction mixture was washed with methanol, dried, mixed with benzene and shaken overnight. A benzene insoluble fraction containing 23% of monomer II was obtained. This insoluble fraction was masticated on a rubber mill whereupon the product was observed to become soluble in benzene and xylene hexafluoride. Masticated natural rubber is insoluble in xylene hexafluoride and soluble in benzene, whereas the homopolymer of monomer II is soluble in xylene hexafluoride and insoluble in benzene.

A film made of the solubilized product containing seg-

TABLE V

| Polymer | Fabric | Percent Polymer in Bath | Initial Rating | | Dry Cleaning, Oil | Washing Rating | |
|---|---|---|---|---|---|---|---|
| | | | Oil | Spray | | Oil | Spray |
| A | Cotton print cloth | 1 | 90 | 100 | | 0 | 50 |
| | Wool gabardine | 0.5 | 100+ | 100 | 0 | | |
| | Wool flannel | 0.5 | 100+ | 100 | 0 | | |
| | Wool tweed | 0.5 | 90 | 100 | 0 | | |
| B | Cotton print cloth | 1 | 100 | 100 | | 100 | 100 |
| | Wool gabardine | 0.5 | 100+ | 100 | 100+ | | |
| | Wool flannel | 0.5 | 100+ | 100 | 100+ | | |
| | Wool tweed | 0.5 | 100+ | 100 | 100+ | | |
| C | Cotton print cloth | 1 | 100 | 80 | | 100 | 80 |
| | Wool gabardine | 0.5 | 100 | 80 | 70 | | |
| | Wool flannel | 0.5 | 90 | 70 | 70 | | |
| | Wool tweed | 0.5 | 100 | 80 | 70 | | | mented copolymer was coated on aluminum panels and showed excellent water and oil repellency.

Fabrics treated with this segmented natural rubber copolymer had oil and spray repellency ratings that were superior to a mixture containing 3 parts natural rubber and 1 part of the homopolymer of monomer II. In each instance the fabrics were treated by dipping them in a 0.5% polymer solution in benzotrifluoride and cured for 10 minutes at 150° C. The observed results were as follows:

| Polymer | Fabric | Oil Rating | Spray Rating |
| --- | --- | --- | --- |
| Segmented | Wool gabardine | 100 | 80 |
|  | Wool flannel | 90 | 80 |
|  | Cotton twill | 50 | 80 |
| 3:1 blend | Wool gabardine | 70 | 80 |
|  | Wool flannel | 80 | 70 |
|  | Cotton twill | 0 | 70 |

EXAMPLE XII

The following monomers and emulsifier were charged into a 16 ounce screw cap bottle and polymerized as described above for 16 hours:

```
                                                    Grams
Monomer II _____     50
Chloroprene _____     50
C8F17SO2N(C2H5)CH2COOK (emulsifier C) _____          5
```

A latex corresponding to 86% conversion to stably emulsified polymer was obtained.

Samples of 50 pound unbleached kraft paper were treated with a latex of the product containing segmented copolymers (0.25 to 1% by weight) of this example and demonstrated resistance to penetration by turpentine.

Solutions (0.5%) of this polymer in 1,1,1-trichloroethane were employed to treat suede, vegetable tanned, and other leathers. In each instance the leather became water and oil resistant.

Felt hats were treated before and after blocking with a 0.25% 1,1,1-trichloroethane solution of the segmented copolymers of this example. Water and oil repellency was imparted to the hats by this treatment.

Microballoons which are used to reduce gasoline evaporation in storage tanks were coated with about 2% by weight of the segmented copolymer of this example. The treated balloons were not wetted by gasoline to the same extent as the untreated balloons and in this manner the evaporation of gasoline was materially reduced.

Glass fiber filters became water and oil repellent upon being treated with a 0.5% solution of the segmented copolymer of this example in a 1,1,1-trichloroethane solution.

Many polyvinyl acetate latices utilized as protective coatings have poor leveling properties. For instance, when an aluminum panel is coated with a polyvinyl acetate latex the film formed has valleys and ridges which are visible to the naked eye and has poor gloss. When a small amount of the segmented copolymers of this example is added to polyvinyl acetate latex a uniform film results. Thus, the segmented copolymer has a leveling effect upon the polyvinyl acetate, in addition to imparting excellent oil resistance and improved water resistance to coatings made from such blended formulations.

One-half percent by weight of solids of the segmented copolymer latex of this example was added to 3 commercially available white latex paints, i.e. a styrene-butadiene copolymer, an acrylic flat wall paint, and a thixotropic acrylic base paint. Paint samples were shaken and then brushed onto plywood and etched aluminum panels and compared to control panels coated with the same paints containing no segmented copolymer. All panels were similar in appearance. The control coatings showed no oil repellency and were visibly stained by a droplet of SAE No. 30 lubricating oil whereas the panels coated with the paints containing the segmented copolymers readily repelled oil, and droplets of a 60:40 volume ratio of n-heptane and mineral oil did not spread on the treated surfaces.

A 15% polyvinyl acetate emulsion to which had been added 2% by weight of the segmented copolymer of this example based on polyvinyl acetate solids was brushed on wallpaper samples so that the coating contained 5% by weight of total polymer blend based on the weight of the wallpaper. Droplets of SAE No. 30 lubricating oil remained as beads on the wallpaper coated with the segmented copolymer whereas the droplets spread on wallpaper treated with the polyvinyl acetate latex only. The treated samples were also superior in their resistance to soiling as observed after subjecting the samples to various tests, e.g. placing the samples side by side on a door panel and thereby subjecting both of them to heavy hand soiling.

EXAMPLE XIII

A product containing segmented copolymer was prepared by polymerizing 12.5 grams monomer II and 12.5 grams chloroprene in the presence of 0.5 gram emulsifier A and 0.75 gram of an ethylene oxide condensate of lauryl alcohol in a 4 ounce screw cap bottle. After reaction at 50° C. for 16 hours, 89% conversion to stably emulsified polymer was obtained.

Treating baths were prepared which contained this segmented copolymer, a treating resin and catalyst. The treating bath in each instance contained 1% of the polymer containing segmented copolymer, 15% by weight of the treating resin and 1.5% of the catalyst in water. The fabric treated in each bath was a blend of rayon, polyester fiber, acrylic fiber and mohair in the weight ratio of 45:43:10:3. The fabric was treated by padding the fabric at 40 pounds nip pressure and subsequently drying and curing for 10 minutes at 150° C. The samples were then laundered three times in an automatic washing machine and electric dryer. Table VI shows the results obtained as to oil and water repellency before and after laundering by various combinations of known textile treating resins and catalysts.

TABLE VI

| Resin [1] | Catalyst [2] | Initial Rating | | Washing Rating | |
| --- | --- | --- | --- | --- | --- |
|  |  | Oil | Spray | Oil | Spray |
| A | A | 100 | 100 | 80 | 80 |
| B | B | 100 | 100 | 80 | 80 |
| C | C | 100+ | 100 | 80 | 80+ |
| D | C | 100+ | 100 | 80 | 80 |
| E | C | 100+ | 100 | 80 | 80 |

[1] Resins:
  A. Urea-formaldehyde resin.
  B. Urea-formaldehyde resin.
  C. Melamine-formaldehyde resin.
  D. Glycol-acetal resin.
  E. Triazine-formaldehyde resin.
[2] Catalysts:
  A. Organic salt.
  B. Acid salt of an inorganic amine.
  C. Inorganic salt.

EXAMPLE XIV

Styrene (40 gms.) and bromotrichloromethane (0.2 gm.) were charged to a glass ampoule, frozen, degassed, thawed, refrozen and sealed under vacuum. After 17 hours' reaction time using ultraviolet light initiation, the contents of the ampoule were a viscous liquid. This liquid was dissolved in benzene and precipitated and washed with methanol. After drying, polystyrene (14 gms.) was recovered.

Polystyrene (5 gms.), prepared as described above, and monomer II (5 gms.) and dioxane (20 gms.) were charged to a glass ampoule and sealed as above. After 15 hours reaction under ultraviolet light irradiation the contents of the ampoule was a milky liquid. The resulting polymer was precipitated with methanol, redispersed in methyl chloroform, and reprecipitated and washed in methanol. After drying 8.2 gms. of polymer were recovered (82% yield). Of this 8.2 grams, 78% was soluble in methyl chloroform. Fluorine analysis showed this portion of the product to contain 17.4% fluorine indicating a block copolymer composition of 65:35 styrene:monomer II. A one percent solution of this block copolymer in methyl chloroform was applied to upholstery fabrics. After drying 10 minutes at 150° C., oil repellencies of 100+ and spray ratings of 80 to 90 were obtained.

The portion of the product not soluble in methyl chloroform was soluble in xylene hexafluoride and contained 48% fluorine.

EXAMPLE XV

Monomer II (15 gms.), triethyl amine (210 gms.) and azobisisobutyronitrile (0.15 gm.) were charged to a 16 oz. screw cap bottle, flushed with oxygen free nitrogen, sealed and rotated end-over-end in a 60° C. water bath for 24 hours. At the end of this time most of the product had precipitated from solution. The precipitated polymer was dissolved in xylene hexafluoride and precipitated with methanol. The triethylamine solution was also precipitated in methanol. The combined precipitates were filtered, washed with methanol and dried. A yield of 6.8 gms. of the homopolymer of monomer II, softening at about 65° C. and melting at about 110° C. was obtained. The homopolymer (3 gms.), acrylonitrile (3 gms.), benzene (9 gms.), xylene hexafluoride (9 gms.) and azobisisobutyronitrile (0.012 gm.) were charged to a glass ampoule, sealed under vacuum and tumbled in a 60° C. water bath for 16 hours. At the end of this time the resulting polymer had precipitated from the solution. After washing with benzene and drying, a polymer (4.65 gms.) was obtained which was 76% soluble in dimethyl formamide. The dimethyl formamide soluble portion contained 13% fluorine indicating a block copolymer composition of 74:26 acrylonitrile:monomer II, which softened at about 150-170° C. and decomposed above 200° C. A film of the block copolymer cast from the dimethyl formamide solution was hard and scuff resistant and exhibited excellent oil repellency.

EXAMPLE XVI

The homopolymer of Example XV (3 gms.), ethyl acrylate (2.25 gms.), acrylonitrile (0.75 gm.), benzene (9 gms.), xylene hexafluoride (9 gms.) and azobisisobutyronitrile (0.012 gm.) were reacted for 16 hours at 60° C. The resulting polymer (3.98 gms.) was dried. This product was 60% soluble in dimethyl formamide and the methyl formamide soluble fraction contained 11.4% fluorine indicating a block copolymer containing 23% of Monomer II derived from the homopolymer prepolymer. The block copolymer was a fairly tough, flexible plastic. A film of the material exhibited good oil and water repellency and excellent scuff resistance.

EXAMPLE XVII

Through a short column of silica gel, Monomer IV (4.9 gms.) was drained into a flamed glass ampoule and frozen in liquid air. In a similar manner, styrene (6.9 gms.) was added to the same ampoule and frozen in liquid air. The ampoule was then connected to a high vacuum apparatus and, while under vacuum and still frozen, 10 ml. of a solution of 0.4 gm. of sodium naphthalene in tetrahydrofuran were added. The entire contents of the ampoule were frozen in liquid air and the ampoule sealed under vacuum. The bottom stratum in the ampoule, monomer IV, was kept frozen in liquid air while the other ingredients were allowed to come slowly to room temperature. Polymerization of the styrene began on thawing as evidenced by deep red colorization, local heat evolution and viscosity increase. When the polymerization of the styrene was apparently complete, monomer IV was allowed to thaw. On vigorous shaking, a small amount of monomer IV was diffused through a barrier of solid polystyrene which had formed at the interface into the supernatant viscous solution of polystyrene in tetrahydrofuran. Monomer IV proceeded to block polymerize onto the polystyrene as evidenced by a fading of the red color and a further increase in viscosity. The ampoule was opened and the liquid contents precipitated in methanol. The precipitate was filtered, washed and dried. The resulting polymer contained 5.3% fluorine indicating a block copolymer composition of 91:9 styrene:monomer IV. The block copolymer was completely soluble in benzene and insoluble in xylene hexafluoride. A film of the polymer was hard, brittle and clear. It exhibited excellent oil and water repellent properties for use in the treatment of textiles.

EXAMPLE XVIII

A cotton fabric was padded in an aqueous dispersion containing the following ingredients: dimethylol ethylene urea (5 parts), ethylene oxide condensation product of lauryl alcohol (0.05 part), dispersible melamine-formaldehyde condensation product (2 parts), ammonium salt accelerator (1 part), magnesium chloride (1 part), segmented copolymer (.75 part) prepared as described in Example XIII, and water (90.20 parts). The resulting fabric had oil repellency and spray ratings of 100.

EXAMPLE XIX

A polyester-cotton blend was padded in aqueous dispersion containing the following ingredients: dimethylol ethylene urea (3 parts), dispersible melamine-formaldehyde condensation product (2 parts), ethylene oxide condensation product of lauryl alcohol (0.01 part), magnesium chloride (1.0 parts), segmented copolymer (.75 part) prepared as described in Example XIII, and water (93.25 parts). The sample was padded so that the fabric retained 55% by weight of the padding dispersion and dried for 7 minutes at 325° F. The resulting fabric had oil repellency and spray ratings of 100.

EXAMPLE XX

Cotton fabric was padded in an aqueous dispersion containing the following ingredients: dimethylol ethylene urea solution (3 parts), melamine-formaldehyde condensation product (3.2 parts), ethylene oxide condensation product of lauryl alcohol (0.05 part), polyvinyl alcohol (1 part), ammonium salt accelerator (1 part), magnesium chloride (1 part), segmented copolymer prepared as described in Example XIII (.75 part) and water (90.0 parts). The sample was padded at 40 lbs. nip pressure, dried for 2 minutes at 250° F. and cured for 1½ minutes at 350° F. The resulting fabric had an initial oil repellency and spray rating of 100.

EXAMPLE XXI

Cotton fabric was padded in an aqueous dispersion containing the following ingredients: water soluble triazine-formaldehyde condensation product (5 parts), magnesium chloride (1 part), isobutyl alcohol (4 parts), segmented copolymer (.9 part) prepared as described in Example XIII, and water (89.1 parts). The sample was padded, dried and cured for 5 minutes at 350° F. The resulting fabric had initial oil repellency and spray ratings of 100. After 5 launderings and pressings, the sample had an oil repellency of 100 and a spray rating of 90.

EXAMPLE XXII

Four cotton samples of varying texture were padded with an aqueous dispersion containing 3 parts by weight of Phobotex FTC, a product of Ciba Products Corp., Fair Lawn, N.J., and identified as a cationic thermosetting resin, 0.75 part by weight of Catalyst RB, a product of Ciba Products Corp. and identified as an aluminum containing organic acid catalyst, and .9 part by weight of a segmented copolymer prepared as described in Example XIII and 95.35 parts by weight of water. The samples were nipped at 20 lbs. with varying degrees of wet pickup as indicated below and then cured for 10 minutes at 150° C.

| Sample | Wet Pickup, Percent | Initial | |
|---|---|---|---|
| | | Oil Repellency | Spray Rating |
| 1 | 60 | 100 | 100 |
| 2 | 22 | 0 | 100 |
| 3 | 63 | 90 | 100 |
| 4 | 69 | 100 | 100 |

EXAMPLE XXIII

The same cotton fabrics were treated in exactly the same manner as indicated in Example XXIII above, except that the padding bath contained, in addition to ingredients set forth in Example XXII, 5% by weight of a water soluble triazine-formaldehyde condensate and 0.5% by weight of magnesium chloride as an accelerator. The initial oil repellency and spray ratings for these samples were as follows:

| Sample | Oil Repellency | Spray Rating |
|---|---|---|
| 1 | 100 | 100 |
| 2 | 100 | 100 |
| 3 | 100 | 100 |
| 4 | 100 | 100 |

It will be appreciated that the treating agents and combinations thereof may vary with the type of textile to be treated. The following combinations of proprietary and commercially available chemicals have been found to be especially useful in treating the indicated fabrics in a manner such that the fabric retains 70% by weight of the aqueous treating media.

Thus, the segmented copolymers first made possible by this invention have been found to be especially useful with thermosettable aminoplasts. Especially useful aminoplasts are triazine-formaldehyde condensation products, some of which are water dispersible but the most preferred are water-soluble, such as poly-methylol-melamines. It will also be appreciated that methylol groups in this type of product are commonly etherified by reaction with aliphatic alcohols such as methanol, ethanol, isopropanol and so forth. Since the ether oxygen is attached to a carbon atom that is attached to a nitrogen atom, it is easy to convert back to the methylol group. Illustrative ethers (partial or total) are the trimethyl ethers of hexa-methylol melamine and tri-methylol melamine. Other suitable thermosettable aminoplasts are the condensation products of an aldehyde, preferably formaldehyde, and urea, thiourea, and cyclic substituted ureas such as ethylene-urea and triazones. The thermosettable aminoplasts may be employed in combination with acidic accelerators or catalysts, such as the salts of weak bases and strong acids, i.e. magnesium chloride, zinc chloride, aluminum chloride, ammonium chloride and tri-ethanol amine-hydrochloride.

We claim:
1. An aqueous composition suitable as a textile treating agent for rendering the textile oil repellent comprising a segmented copolymer selected from the group consisting of block and graft copolymers comprising 0.5–80 percent by weight of at least one A segment comprising at least four polymerized units of $R_fP$ where P is a radical containing a polymerizable ethylenic group and $R_f$ is a perfluoroalkyl radical of the formula $C_nF_{2n+1}$ where $n$ is at least 4; said A segment containing at least 30 percent by weight of fluorine derived from said group; and 20–99.5 percent by weight of at least one B segment which comprises at least 5 consecutive monomeric units of a polymerizable ethylenically unsaturated monomer different from said fluorine-containing monomeric units; said B segment containing less than 10 percent by weight of fluorine derived from said $R_f$, a thermosettable aminoplast aldehyde condensation product of a compound selected from the group consisting of triazine, urea, thiourea and cyclic substituted urea, and water.

2. An aqueous composition suitable as a textile treating agent for rendering the textile oil repellent comprising a segmented copolymer selected from the group consisting of block and graft copolymers comprising 0.5–80 percent by weight of at least one A segment comprising at least four polymerized units of $R_fP$ where P is a radical containing a polymerizable ethylenic group and $R_f$ is a perfluoro alkyl radical of the formula $C_nF_{2n+1}$ where $n$ is at least 4; said A segment containing at least 30 percent by weight of fluorine derived from said group; and 20–99.5 percent by weight of at least one B segment which comprises at least 5 consecutive monomeric units of a polymerizable ethylenically unsaturated monomer different from said fluorine-containing monomeric units; said B segment containing less than 10 percent by weight of fluorine derived from said $R_f$, a triazine-formaldehyde condensation product as the thermosettable aminoplast and water.

3. The composition of claim 2 in which the triazine-formaldehyde condensation product is water soluble.

4. The composition of claim 2 in which the triazine-formaldehyde condensation product is a melamine-formaldehyde condensation product.

5. An improved textile treating process for rendering a textile oil repellent comprising padding a textile in an aqueous composition comprising a segmented copolymer selected from the group consisting of block and graft copolymers comprising 0.5–80 percent by weight of at least one A segment comprising at least four polymerized units of $R_fP$ where P is a radical containing a polymerizable ethylenic group and $R_f$ is a perfluoroalkyl radical of the formula $C_nF_{2n+1}$ where $n$ is at least 4; said A segment containing at least 30 percent by weight of fluorine derived from said group; and 20–99.5 percent by weight of at least one B segment which comprises at least 5 consecutive monomeric units of a polymerizable ethylenically unsaturated monomer different from said fluorine-containing monomeric units; said B segment containing less than 10 percent by weight of fluorine derived from said $R_f$, a thermosettable aminoplast aldehyde condensation product of a compound selected from the group consisting of triazine, urea, thiourea and cyclic substituted urea, and water, drying the fabric and heating the fabric to thermoset the aminoplast resin.

References Cited by the Examiner
UNITED STATES PATENTS

| 2,536,050 | 1/1951 | Fluck | 260—29.4 |
| 2,888,420 | 5/1959 | Sulzer et al. | 260—29.4 |
| 3,068,187 | 12/1962 | Bolstad et al. | 260—29.6 |

MURRAY TILLMAN, *Primary Examiner.*

JOHN C. BLEUTGE, *Assistant Examiner.*